Figure 1:
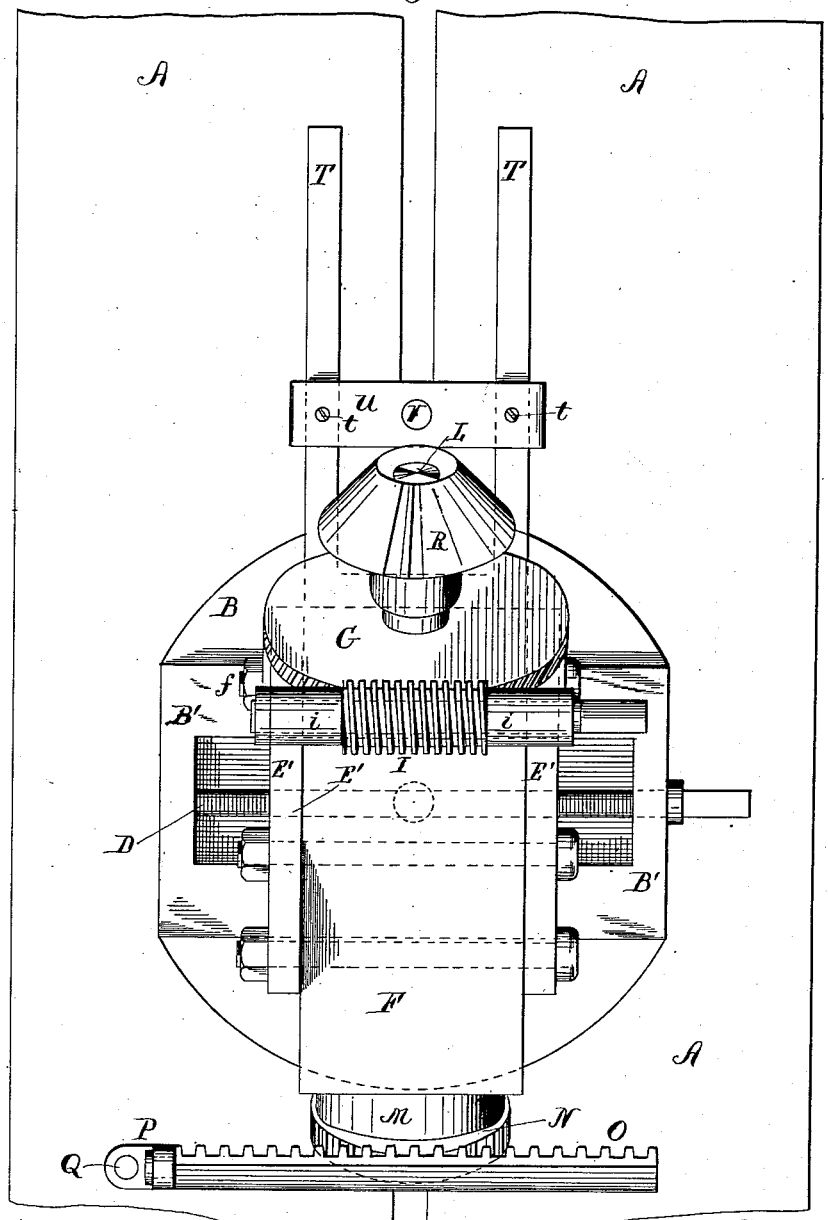

(No Model.) 4 Sheets—Sheet 1.

R. FLANIGAN.
GEAR CUTTING MACHINE.

No. 439,134. Patented Oct. 28, 1890.

Witnesses
Edward A. Osee,
E. E. Masson

Inventor
Robert Flanigan
By his Attorney
Shipley Brashears

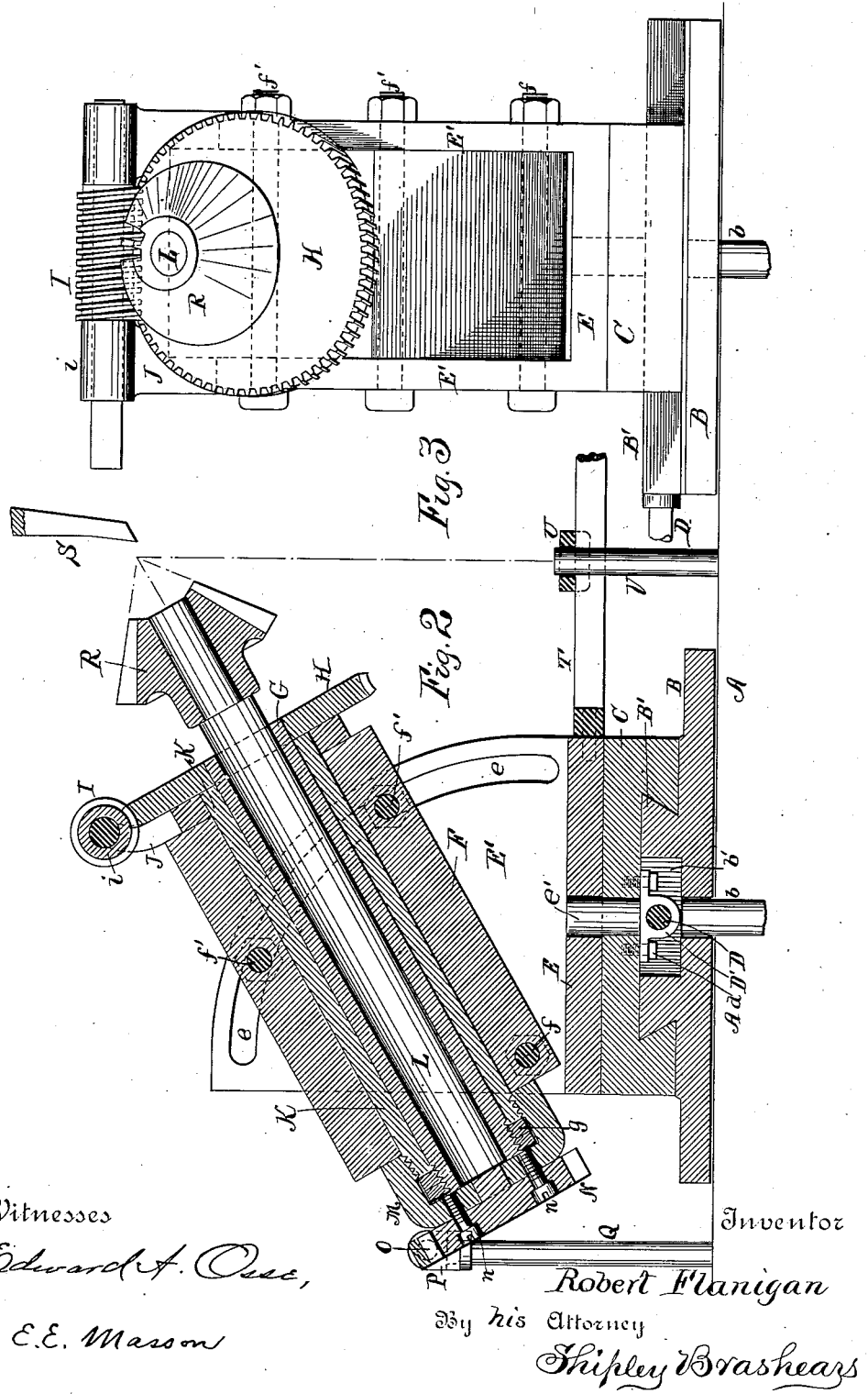

(No Model.) 4 Sheets—Sheet 3.
R. FLANIGAN.
GEAR CUTTING MACHINE.
No. 439,134. Patented Oct. 28, 1890.
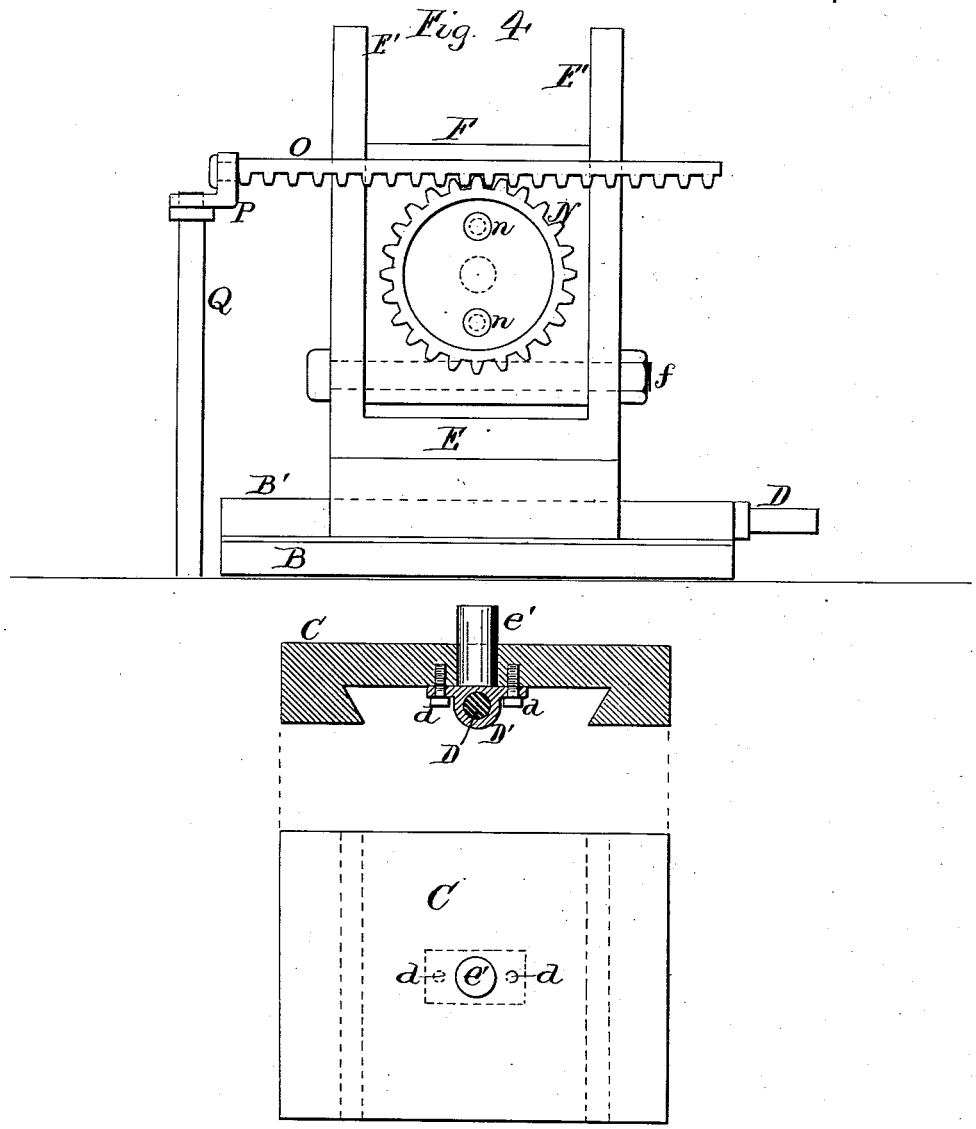
WITNESSES:
Edward A. Osse,
E. E. Masson
INVENTOR
Robert Flanigan
BY Shipley & Brashears
ATTORNEY.

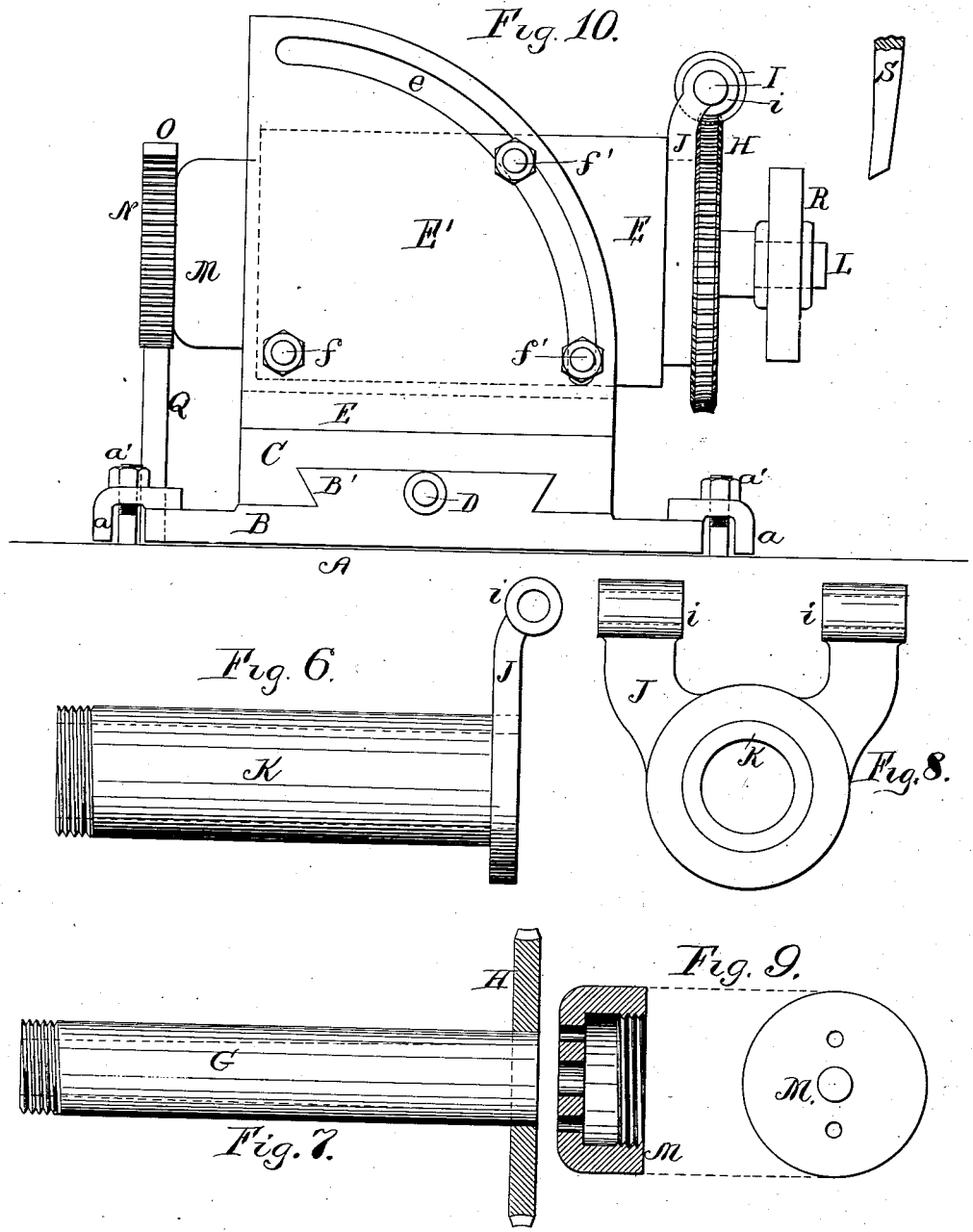

UNITED STATES PATENT OFFICE.

ROBERT FLANIGAN, OF BALTIMORE, MARYLAND.

GEAR-CUTTING MACHINE.

SPECIFICATION forming part of Letters Patent No. 439,134, dated October 28, 1890.

Application filed June 9, 1890. Serial No. 354,750. (No model.)

*To all whom it may concern:*

Be it known that I, ROBERT FLANIGAN, a citizen of the United States, residing at Baltimore city, in the State of Maryland, have invented certain new and useful Improvements in Gear-Cutting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to machines for cutting the teeth of gear-wheels of that class in which the cutting is done by a planing-tool. It is in the nature of improvements upon such machines for cutting various kinds of gear-teeth, but especially the teeth of bevel-gears, and has for its object to furnish an improved machine for the purpose in which the blank is so fed to the cutter that the teeth are cut in the form usually known as "truncated wedge-shaped teeth," having clearance-curves near the base of the teeth.

With this object in view my invention consists in the improved construction, arrangement, and combination of parts hereinafter fully described, and afterward specifically pointed out in the claims.

In the accompanying drawings, Figure 1 is a top plan view of my invention in place on the platen of a planer, ready for operation. Fig. 2 is a central vertical longitudinal section thereof, showing also the cutting-tool in its relative position. Fig. 3 is an elevation of the forward end. Fig. 4 is an elevation of the rear end. Fig. 5 is a detail showing the transverse slide in plan and section. Fig. 6 is a view in side elevation of the outer sleeve and bearing-bracket for the worm. Fig. 7 is a view in side elevation of the inner sleeve and the worm-wheel. Fig. 8 is an end elevation of the devices shown in Fig. 6. Fig. 9 is a detail showing the cap-nut on the outer sleeve in plan and section. Fig. 10 is a side elevation of a modification for cutting straight gears. Fig. 11 is a view showing the various positions the teeth assume with relation to the tool while being cut.

Like letters of reference mark the same parts wherever they occur in the various figures of the drawings.

Referring to the drawings by letters of reference, A is the planer-table or platen.
B is a base-plate mounted upon the platen and connected therewith by a loose central pivot-pin *b*. This plate has formed upon its uppersurface a transverse dovetailed rib or guide B', which fits in a corresponding dovetailed groove in the under side of a transversely-sliding plate C. The rib B' is provided with a central hollow or cut-away portion *b'* to accommodate the propelling hand-screw D, which rotates in bearings in the ends of the rib and engages a nut D', secured by bolts or screws *d* or otherwise to the under side of plate C.

Upon the top of plate C is mounted a plate E, having uprights E' arising from its edges, such plate and uprights forming a box, in which is mounted a block F, swinging on trunnions *f* and secured in any adjustments by bolts *f'*, passing through arc-shaped slots *e* in said uprights. This plate E is connected to plate C by means of a loose central pivot *e'*, as shown.

G is a sleeve, having at its forward end a worm-wheel H, rigidly secured to it, in gear with a worm or endless screw I, mounted in bearings *i* on a forked bracket J, rigidly secured to the forward end of another sleeve K, surrounding the sleeve G, both of these sleeves being mounted to turn independently within a central bore in the block F. The inner sleeve G is rigidly secured upon a mandrel L, and the only connection between it and the outer sleeve K is through the medium of the worm and screw, as just described. The inner sleeve G extends rearward a slight distance beyond the outer sleeve, and is prevented from moving longitudinally therein by means of a ring-nut *g* on such rear extension.

On the rear end of the outer sleeve K is a cup-nut M.

N is a gear-wheel secured to this cup-nut M by bolts *n*. This gear-wheel meshes with a rack which is mounted pivotally on a bracket P to permit it to turn axially, and this bracket is pivoted to the top of a bar Q, rising from the planer-bed, the rack being thus made adjustable to suit the position of the wheel N, with which it meshes, and allowed to turn to accommodate itself to the motion of the wheel when carried around, as hereinafter described.

On the front of the mandrel is secured the blank R, in which the teeth are to be cut by a tool S.

At the forward end of the plate E are rigidly secured arms T, on which is mounted a cross-bar U, adapted to slide thereon and secured in any desired position by screws t. This cross-bar U is pivotally mounted at its center upon a rod V, rising from the planer-bed.

The object of the construction hereinbefore described is to cause the gear-blank to be properly presented and fed along under the the tool W, which is secured in the cross-head of the planer, (not shown,) such proper presentation requiring that the blank be fed forward, so that the tool will cut in lines extending from the point where would be the apex of the bevel-gear blank if it were extended to a complete cone, and, further, that the blank be rolled on its pitch-line, whereby it will assume the several positions with relation to the tool, as shown in Fig. 11, to properly form the teeth.

The bearing-block is properly adjusted in the box to give the angle on which the teeth are to be cut and secured by the set-screws in the arc slots in the sides of the box. The blank-mandrel and with it the blank is turned after each tooth is completed by turning the worm-screw a sufficient distance to present the proper portion for the next tooth. This distance can be regulated in any desired manner, index-plates and indicators for such purposes being well known. The blank having been adjusted as far as described, it is moved forward, causing a cut to be made by the tool in approximately the relative position of tool and blank shown in the left-hand portion of Fig. 11. After this cut it is necessary to change the position of the blank to substantially that shown next to the right in Fig. 11. In making this adjustment the blank must always be kept with its apex (if continued) stationary, and the adjustment is effected by turning the screw D. The primary effect of turning this screw is to cause the plate C to slide transversely on base-plate B and carry the box in which the mandrel-bearing block is mounted, and the effect of such motion alone would be to cause the second cut to be parallel with the first and to move the apex-point of the blank. Such movement being undesirable, it is prevented by pivoting the box on the transversely-sliding plate C, projecting the arms T from the box and connecting it to the platen pivotally at a point directly under the apex-point by means of cross-bar U and rod V, said cross-bar being adjustable on the arms T to suit blanks of different sizes and angles of teeth. As the plate C moves transversely, the box turns upon it and upon the pivot-rod V, and to render this movement possible the base-plate B is pivoted to the platen A, as before described. As the box carrying the bearing-block and blank with it is moved around, (the gear-wheel N being in engagement with the rack O,) the mandrel is caused to rotate, and thus rock the blank on its pitch-line, successively bringing the blank and tool into the relative positions. (Shown in Fig. 11 from left to right.) The rack O is pivoted to turn on its axis to accommodate itself to the angle at which it engages the teeth of the gear-wheel and to move horizontally on rod Q to accommodate itself to the curved-line movement of the gear-wheel N.

In Fig. 10 I show my mechanism in a slightly modified form for cutting straight gear-teeth. In this form the base-plate B is rigidly secured to the platen by dogs a and bolts a', and there is no necessity for pivoting the box to the plate C.

Having thus fully described my invention, what I claim as new, and desire to secure by Letters Patent of the United States, is—

1. In a gear-cutting machine, the combination of the reciprocating platen of the planer, a base-plate lying thereon and connected thereto by a vertical pivot, a plate mounted on the base-plate to slide transversely thereupon, a vertically-swinging bearing-block mounted between upright plates carried by said transversely-sliding plate, and a mandrel for the gear blank mounted in said bearing-block, as set forth.

2. In a gear-cutting machine, the combination of the reciprocating platen, the base-plate connected thereto by a vertical pivot, a transversely-sliding plate mounted on the base-plate, a box lying on said transversely-sliding plate and connected thereto by a vertical pivot, a vertically-swinging bearing-block mounted in said box, and a mandrel for the gear-blank mounted in said bearing-block, as set forth.

3. In combination, the platen, the pivoted base-plate, the transversely-sliding plate mounted thereon, and the box in which the mandrel of the gear-blank is mounted, pivoted to the transversely-sliding plate and to the platen, substantially as set forth.

4. In combination, the platen, the base-plate connected thereto by a vertical pivot, the transversely-sliding plate mounted thereon, the box mounted thereon by means of a vertical pivot and carrying the bearing-block for the gear-blank mandrel, the arms projecting forward from the base-plate of said box, the cross-bar sliding on said arms, and the rod pivotally connecting said cross-bar with the platen, as set forth.

5. In combination, the platen, the base-plate pivoted thereto, the transversely-sliding plate mounted thereon, the box carried by the transversely-sliding plate, the bearing-block mounted in said box, the gear-blank mandrel journaled therein, the gear-wheel H, connected to said mandrel, and the rack mounted upon the platen and engaging said gear-wheel, as set forth.

6. In combination, the box, the bearing-block mounted therein, the mandrel carrying the gear-blank, a sleeve rigidly secured on said mandrel, a worm-wheel mounted on the forward end thereof, a second sleeve around the first and mounted in the bearing-block, and a worm-screw mounted in bearings secured to the forward end of the second sleeve and meshing with the worm-wheel, as and for the purpose set forth.

7. In combination, the box, the bearing-block pivoted therein to swing vertically, the two sleeves in said box, the worm-wheel carried by the inner sleeve, the worm-screw carried by the outer sleeve, the mandrel in the inner sleeve, the gear-wheel secured to the rear end of the outer sleeve, and the rack with which it engages mounted on a rod rising from the platen, as set forth.

8. In combination, the bearing-block, the outer sleeve therein, carrying at its forward end the forked bracket and at its rear end the cup-nut, the worm-screw having bearings in said forked bracket, the inner sleeve, the worm-wheel mounted on the forward end thereof and meshing with the worm-screw, the gear-wheel secured to the cup-nut of the outer sleeve, and the rack mounted on the platen and engaging with said gear-wheel, as set forth.

In testimony whereof I affix my signature in presence of two witnesses.

ROBERT FLANIGAN.

Witnesses.
S. BRASHEARS,
S. BRASHEARS, Jr.